United States Patent [19]

Raufast

[11] Patent Number: 4,921,678
[45] Date of Patent: May 1, 1990

[54] APPARATUS FOR DEGASSING AND PELLETING POLYOLEFINS

[75] Inventor: Charles Raufast, Saint Julien les Martigues, France

[73] Assignee: BP Chemicals Limited, London, United Kingdom

[21] Appl. No.: 273,794

[22] Filed: Nov. 21, 1988

Related U.S. Application Data

[62] Division of Ser. No. 44,442, Apr. 30, 1987, Pat. No. 4,820,463.

[30] Foreign Application Priority Data

May 6, 1986 [FR] France ................. 8606548

[51] Int. Cl.$^5$ ............................................. B01J 8/20
[52] U.S. Cl. .................................. 422/110; 34/31; 422/134; 422/142; 425/143; 425/203; 425/209
[58] Field of Search ............... 422/109, 110, 111, 134, 422/135, 140, 142; 55/1, 20, 406, 422, 428, 430; 425/143, 203, 209; 264/40.6; 34/30, 31, 181, 182

[56] References Cited

U.S. PATENT DOCUMENTS

| | | | |
|---|---|---|---|
| 3,327,034 | 6/1967 | Klosek et al. ................. | 264/85 |
| 3,450,183 | 6/1969 | Hinton ........................... | 422/134 |
| 3,486,864 | 12/1969 | Van Der Schee et al. ..... | 425/205 X |
| 3,547,890 | 12/1970 | Yamada et al. ................ | 422/135 |
| 4,029,300 | 6/1977 | Morishima et al. ........... | 366/75 |
| 4,029,877 | 6/1977 | Yoshiura et al. .............. | 528/483 |
| 4,065,532 | 12/1977 | Wild et al. ..................... | 264/68 |
| 4,094,942 | 6/1978 | Nakai et al. .................... | 264/102 |
| 4,122,135 | 10/1978 | Valoti et al. ................... | 264/142 X |
| 4,217,444 | 8/1980 | Pompon et al. ............... | 528/499 |
| 4,372,758 | 2/1983 | Bobst et al. ................... | 528/483 X |
| 4,589,896 | 5/1986 | Iwasaki et al. ................ | 34/182 |
| 4,781,896 | 11/1988 | Willmore et al. .............. | 422/134 |

FOREIGN PATENT DOCUMENTS

| | | | |
|---|---|---|---|
| 1150 | 3/1979 | European Pat. Off. ........... | 528/483 |
| 6288 | 1/1980 | European Pat. Off. ........... | 528/502 |
| 3108093 | 9/1982 | Fed. Rep. of Germany . | |
| 882675 | 11/1961 | United Kingdom ............... | 528/483 |
| 2093462 | 9/1982 | United Kingdom ............... | 528/483 |

Primary Examiner—Jay H. Woo
Assistant Examiner—K. P. Nguyen
Attorney, Agent, or Firm—Brooks, Haidt, Haffner & Delahunty

[57] ABSTRACT

The invention relates to a process and a device for degassing and converting into pellets polyolefins from a gas-phase reactor.

A device according to the invention comprises, in combination (FIG. 1):

a reactor (1) for the catalytic polymerization in the gas phase of alpha-olefins, equipped with a polyolefin outlet (9);

A device (12) for primary degassing by separation of the solid and gas phases, connected to the said outlet;

A device for secondary degassing (14) to substantially free the particles of the gases accompanying them and which is connected to the outlet of the primary degassing (12) and which comprises a mechanical stirrer (14a) making it possible to raise the temperature of the particles to a temperature close to the minimum sintering temperature by conversion of the mechanical energy into heat;

and a device (15) for pelleting the particles by extrusion through a die, this device being connected to the outlet of the said secondary degassing device.

6 Claims, 1 Drawing Sheet

APPARATUS FOR DEGASSING AND PELLETING POLYOLEFINS

This is a division of application Ser. No. 07/044,442, filed Apr. 30, 1987 now U.S. Pat. No. 4,820,463.

The present invention relates to a process and to a device for degassing and directly converting into pellets particles of polyolefins leaving a gas-phase polymerisation reactor. More especially the invention relates to the production of polymers or copolymers of alpha-olefins particularly polyethylene and copolymers of ethylene and of higher alpha-olefins having from 3 to 12 carbon atoms, by catalytic polymerisation at low pressure in the gas phase, either in a stirred apparatus where the particles of polymer are maintained in suspension by mechanical agitation, or in a fluidised-bed reactor.

DESCRIPTION OF THE RELATED ART

The polymer or copolymer produced in the stirred apparatus or in the fluidised bed reactor may be withdrawn by a continuous or discontinuous process. During the withdrawal, a part of the gaseous atmosphere accompanies the solid product. For reasons of process economy, the products withdrawn pass into a primary degasser which makes it possible to separate on the one hand the solid products and on the other hand a gas phase rich in monomer, which is recycled into the reactor. The powder leaving the primary degasser is accompanied by a small quantity of process gas, in particular by gas occluded in the pores of the solid particles. The powder is then generally cooled and stored in silos, in which the accompanying gases are liable to diffuse slowly out of the particles and the content of hydrocarbon in the atmosphere of the silos or in their vicinity may become excessive having regard to the safety standards for human beings, or even involve risk of explosion. Likewise, these gases are freed during the pelleting of the particles and may cause difficulties at this stage.

To avoid these problems, in the processes known to date, the particles leaving the primary degassing undergo a secondary degassing before being stored. This degassing is accomplished, for example, by bringing the solid particles into contact with a cold gas stream of air or nitrogen for a period of the order of 5 to 30 minutes.

During this operation the polymer powder cools on contact with the cold gas. This cooling is harmful to the economics of the process when, as is very often the case, the subsequent operation is a pelleting of the particles by passage through an extruder which demands re-heating of the polymer close to its melting temperature. Moreover, the cooling of the powder makes more difficult the separation of the gas from the particles in which it is included.

One object of the present invention is to provide means making it possible to effect good secondary degassing of the hot polyolefin particles leaving a primary degasser and to convert directly these particles into pellets without storing the polymer in an intermediate silo.

Another object of the invention is to provide means making it possible to effect a good secondary degassing of polyolefin particles which have to undergo a subsequent pelleting treatment by extrusion, in such a way that the particles leave the secondary degasser at a relatively high temperature and enter the extruder at this temperature, so that the utilisation of energy necessary for the pelleting is reduced.

It has been described in DE No. 3108093 (Berstorff Maschinen) a method for pelleting particles of a polymer, such as a polyethylene, produced in a gas-phase polymerisation reactor. A mixture of the polymer and of the gas present in the polymerisation reactor is withdrawn from the latter through a lock chamber and is introduced into a cyclone in which the polymer is partly degassed. The gas which separates is recycled into the polymerisation reactor, whereas the solid polymer particles are introduced into a vertical mixer wherein it is transformed into a plastic mass which is introduced into the inlet of a pelleting machine. According to DE 3108093 the advantage of the method is that the plasticised polymer mass acts as a sealant which prohibits that outside gas, such as air, could enter into the pelleting machine. As a result, however, the polymer cannot be degassed before entering the pelleting equipment, and gas containing monomer is freed from the polymer during the pelleting operation, which is extremely hazardous and involve high risk of explosion.

European patent application EP-A-No. 0006288 (Imperial Chemical Industries) describes a process and an apparatus for separating olefin monomer from a solid particulate polymer, especially polypropylene obtained by a gas phase polymerisation. A mixture of the polymer and of the gas present in the polymerisation reactor is introduced into a cyclone wherein the polymer is partly degassed. Before being exposed to the atmosphere the polymer is then subjected to mechanical agitation until the temperature of the polymer attains at least 90° C., whereas the released olefin monomer is separated from the polymer and recycled to the polymerisation reactor. The treatment is performed in the absence of oxygen and preferably in the absence of any gas stream which would dilute the recovered monomer.

The object of the process described in this patent application is to recover non-polymerised gases rich in monomers to recycle them into the reactor. The degassed solid products are sent into a storage vessel or into a device where they undergo a treatment intended to eliminate the catalyst residues.

Devices referred to as finishers are known which are mechanical agitators employed to modify the physical state of particles of thermoplastic resins in order to improve their flowability and their bulk density. These finishers are produced in particular by WEDCO Inc and they are described for example in U.S. Pat. No. 3,229,002 and FR-A- No. 2160434 belonging to the said company.

U.S. Pat. No. 3,229,002 describes an application of the finishers to resins pulverised in a pluverising equipment for obtaining a finely divided powder, having therefore a poor flowability.

Patent FR-A-No. 2160434 describes an application of the finishers to particles of thermoplastic resin in order to add to these a coloured pigment or any other charge in the finely divided state.

These prior patents relate to applications concerning powders which have been previously freed from the major part of the occluded gases.

The published patent application GB-No. 2077272B (Asahi Kasei) describes a process intended to increase the size of the particles. According to this process the particles are preheated, then subjected to a mechanical agitation in a high-speed rotary mechanical stirrer equipped with a heating jacket, for example, a stirrer of the "Henschel" type. The particles are brought to the temperature of mutual adhesion, that is to say a temperature which is at least the initial melting temperature and which can be 20° C. higher than the melting point of the resin. The powder leaving the stirrer is cooled by agitation in a current of cold air.

This prior patent describes a treatment of the particles of polyolefins by mechanical agitation and heating of the particles, but it does not teach or suggest that the particles can be degassed by such a mechanical treatment. Moreover, the aim of the treatment described is to eliminate pelleting and the particles are cooled at the outlet from this stirrer.

The process according to the invention is intended to convert into pellets polyolefin particles which have been produced in a gas-phase catalytic polymerisation reactor and which have undergone a primary degassing at the outlet from the said reactor, but which still contain occluded gases from which they must be freed before they are extruded.

The objectives of the invention are achieved by a process according to which the particles leaving the primary degasser are introduced into a secondary degassing device equipped with a mechanical stirrer in which they are agitated for a period such that the particles are brought by mechanical agitation to a temperature close to the minimum sintering temperature, so that they are substantially freed from the gases accompanying them, and the hot particles leaving the said mechanical stirrer are introduced into the extruder of a pelleting unit.

The temperature at which the particles are brought by mechanical agitation is suitably close to the minimum sintering temperature and is preferably comprised between Ts−5° C. and Ts+5° C., more especially between Ts−2° C. and Ts+2° C., Ts being the minimum sintering temperature of the particles.

Preferably the secondary degassing is performed in the presence of a gas stream introduced into the secondary degasser. This gas stream advantageously consists of an inert gas such as nitrogen. It may also consist of a gas containing oxygen and/or water vapour which inactivate the constituents of the polymerisation catalyst.

SUMMARY OF THE INVENTION

The device according to the invention for degassing and converting into pellets polyolefin particles produced in a gas-phase catalytic polymerisation reactor for alpha-olefins equipped with a polyolefin outlet comprises, in combination:

a device for primary degassing by separating the solid and gas phase which is connected to the said outlet;

a secondary degassing device to free substantially the particles from the gases accompanying them, and which is connected to the outlet of the said primary degassing and which comprises a mechanical stirrer making it possible to raise the temperature of the particles to a temperature close to the minimum sintering temperature by converting the mechanical energy into heat and a device for pelleting the particles by extrusion through a die, this device being connected to the outlet of the said secondary degassing device.

According to a preferred mode of embodiment, the secondary degassing device comprises of cylindrical chamber with a horizontal axis having a particle inlet which is connected to the outlet of the primary degasser and a particle outlet which is connected to the particle pelleting device, which chamber is provided with a horizontal shaft carrying stirrer blades and which is rotated by a motor.

The residence time of the particles in the said chamber and the speed of rotation of the shaft can be set so that the particles are brought by mechanical agitation to a temperature close to the minimum sintering temperature of the polyolefin particles.

The secondary degassing of the particles by means of a mechanical stirrer which heats the particles solely by the conversion of mechanical energy into heat, makes it possible to attain and even slightly to exceed the minimum sintering temperature without creating hot spots inside the mass of particles and without the particles forming conglomerates.

It is known that the high temperature favours the exit of the gases occluded in the pores of the particles, and the process according to the invention, which makes it possible to bring the particles to a temperature as high as possible without creating a conglomerate of adhering particles, permits of obtaining a very good secondary degassing.

A secondary degassing device according to the invention permits of feeding the pelleting device with hot degassed particles, so that the energy consumed by the extruder to melt the particles is reduced. A large part of the mechanical energy utilised for the secondary degassing is saved.

The process and the secondary degassing device according to the invention make it possible to free the polyolefin particles from the occluded gases without any unfavourable thermal effect.

The following description relates to the attached drawings which represent an example of a working device according to the invention, whilst not having a restrictive character.

DESCRIPTION OF THE PREFERRED EMBODIMENTS

Figure 1:
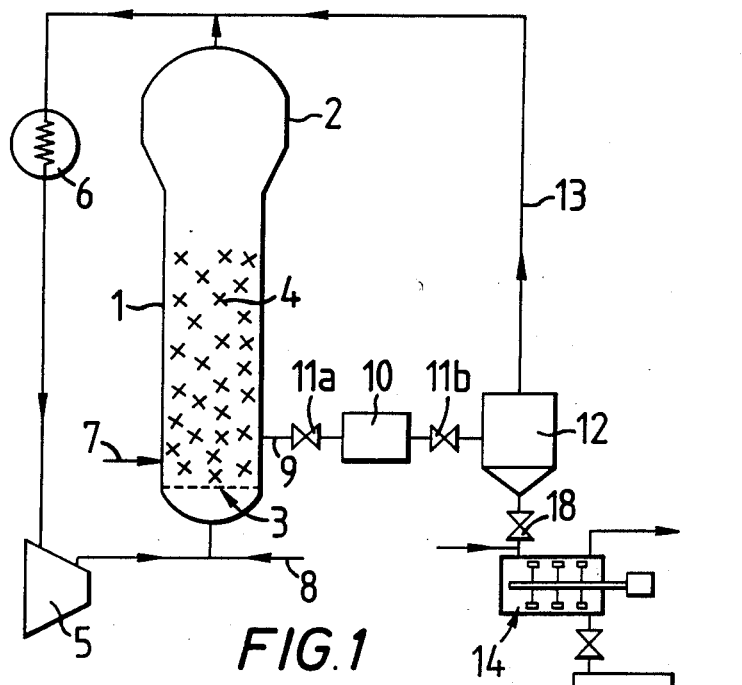
FIG. 1 represents in diagram form an assembly of a device for the polymerisation or copolymerisation of olefins in the gas phase and for pelleting the polyolefins.

FIG. 1 represents a reactor for polymerisation of olefins in the gas phase in a fluidised bed. This type of reactor is well known and it is pointless to describe it in detail. One may point out merely that it comprises a vertical cylindrical chamber (1) which has a widening (2) at the top. It comprises a fluidisation grid (3) above which there is a fluidised bed (4), consisting of polyolefin particles in the course of polymerisation which are maintained in the state of a fluidised bed by a rising gas stream. The hot gases leaving the top of the reactor are taken up by a blower (5) which delivers them to the base of the reactor.

The recycled gases pass into a cooler (6). The chamber (1) comprises a catalyst inlet (7) and an inlet (8) for monomeric olefins. It comprises an outlet (9) for withdrawal of polymer particles.

By way of illustration FIG. 1 represents a fluidised-bed reactor for the catalytic polymerisation of olefins in the gas phase, but it is specified that this reactor could also be a reactor in which the particles are maintained in suspension by mechanical agitation.

The polyolefins produced by the actor are withdrawn via the outlet (9) continuously or intermittently.

In the mode of embodiment represented in FIG. 1, the withdrawal point (9) is equipped with a lock chamber (10) placed between two valves (11a) and (11b) activated alternately so that the withdrawal does not disturb the operation of the reactor. During the withdrawal a part of the gaseous atmosphere of the reactor accompanies the solid polyolefin particles. The mixture of gas and of solid particles is treated in a primary degasser (12) which permits of separating the solid phase from a part of the gas phase accompanying the particles. The primary degasser (12) is, for example, a cyclone, but may be replaced by any other equivalent means of separation of gas from solid. The gases rich in non-polymerised monomers are recycled into the reactor by a pipe (13).

A system according to the invention comprises a secondary degassing device (14) which is equipped with a mechanical stirrer (14a), which receives the solid particles leaving the primary degasser (12) and which frees them from the majority of gases accompanying them by a process consisting in heating the particles up to a temperature close to the minimum sintering temperature by mechanical stirring.

The hot, degassed particles leaving the secondary degassing device (14) are sent into a pelleting device (15) which comprises an extruder provided with an extrusion die and means for cutting the extruded filaments into pellets. The temperature of the particles entering the device (14) is generally comprised between 60° and 120° C.

The residence time of the particles in the device (14) and the rotation speed of the mechanical stirrer (14a) are set so that the particles are brought to a temperature close to the minimum sintering temperature of the particles. It is known that polyolefin particles do not have a precise melting temperature but that they can be characterised by a temperature, called minimum sintering temperature, at which they begin to soften and have a tendency to stick together.

According to Peter Comso et al (Part. Charact./1984. pp 171-177) this minimum sintering temperature is the temperature at which a large drop in surface viscosity of the particles occurs. Several methods have been recorded by the authors, for determining the minimum sintering temperature of the particles. A known method consists in performing fluidisation experiments using the particles and correlating the minimum fluidisation velocity as a function of temperature. At the minimum sintering temperature a discontinuity appears in the correlation, as a result of the formation of agglomerates of particles. As a variant, it is possible to correlate the pressure drop in the fluidisation apparatus as a function of tempertture, using a gas velocity slightly higher than the minimum fluidisation velocity; when sintering occurs, a sharp decrease in pressure drop is observed. Another method proposed by the authors of the cited article consists in determining the elongation of a column of particles under a specific load as a function of the temperature. According to the nature of the polyolefin involved, the above mentioned methods indicate a minimum sintering temperature varying within a range of a few degrees. Due to this fact, it is recommended to determine the proper temperature condition in the device (14) itself, within a range of temperature of +5° C.

When sintering occurs, the particles of powder melt superficially and it might be thought that this suprfical melting would tend to prevent degassing. Experiments performed with a secondary degassing device according to the invention have shown that it was possible to reach and even slightly to exceed the minimum sintering temperature of the particles without their sticking together and without the superfical melting of the particles preventing the occluded gases from leaving them, the mobility of the gases being improved by the increase in temperature.

In one system according to the invention for the production of polyethylene or copolymers or ethylene and higher alpha-olefins containing from 3 to 12 carbon atoms, the operation of the mechanical stirrer (14) is set so that the temperature of the particles leaving the device (14) is comprised between 80° C. and 120° C.

The heating up of the particles under the effect of the mechanical energy of stirring makes it possible both to obtain better degassing by operating at the minimum sintering temperature and a considerable saving in energy, since the particles leaving the secondary degassing (14) are entered hot into the pelleting device (15) and the consumption of energy by this apparatus is consequently substantially reduced.

Figure 2:
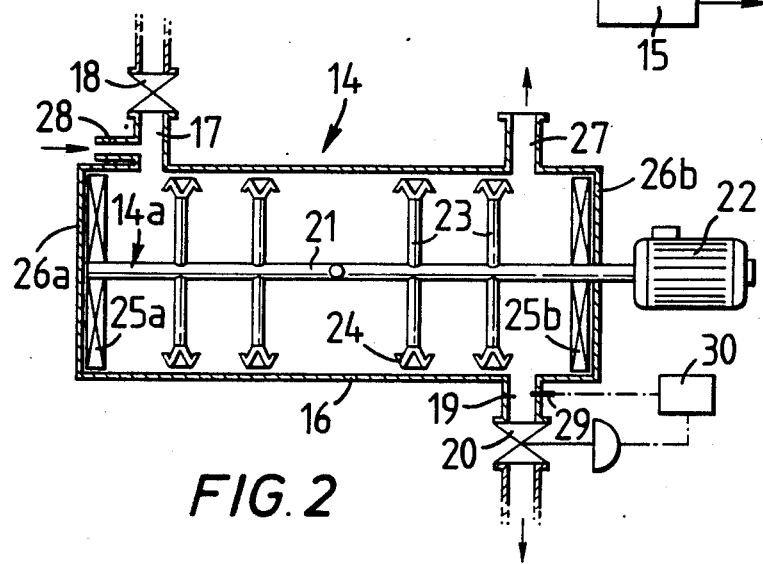
FIG. 2 represents an axial section through a mechanical stirrer device applicable to the invention.

FIG. 2 is an axial section on a larger scale of a preferred mode of embodiment of the secondary degassing device (14).

The latter comprises a fixed cylindrical chamber with a horizontal axis (16) which is equipped with a particle inlet (17) located at one end of the chamber near the upper generatrix. The inlet (17) is connected to the outlet of the primary degasser (12) via a valve (18) which makes it possible to break off the communication. The chamber (16) comprises an outlet (19) for the degassed solid particles which is located at the bottom of the tank, at the end opposite the inlet (17). The outlet (19) is provided with a motorised valve (20).

The chamber (16) comprises a mechanical stirrer (14a) which consists of a horizontal shaft (21), set in rotation by a motor (22) and carrying radial arms (23) the ends of which carry stirrer blades (24).

According to the preferred mode of embodiment, the apparatus (14a) is a agitator of the WEDCO type, the blades of (24) of which have the shape of ploughshares. The shaft (21) carries at both its ends scraper blades (25a), (25b), which rub against the plain walls (26a), (26b), closing the two ends of the cylindrical chamber (16).

The chamber (16) comprises another gas outlet (27) which is located at the end of the upper generatrix opposite the inlet (17) and which may be connected for example to a burner for gaseous effluents.

In order to facilitate discharge of the gases, the chamber (16) may comprise means making it possible to circulate a scavenging gas in the chamber. These means consist for example of a pipe (28) which is connected to the inlet (17), into which an inert gas is passed, for example nitrogen. Advantageously the scavenging gas contains oxygen and/or water vapour, so that it is possible to decompose the traces of residual catalyst contained in the polymer particles. The scavenging gas passed through the chamber, mixing with the gas extracted from the particles and entrainng the latter towards the outlet (27).

The energy of mechanical stirring of the particles is converted into heat and the temperature of the particles leaving the chamber depends on the speed of rotation of the shaft (21) and the residence time of the particles in the chamber. It has been seen above that it was desirable to attain and even to exceed the minimum sintering temperature of the polymer so as to improve the secondary degassing. It is therefore of interest to control the residence time of the particles in the chamber so as to regulate the temperature accurately. For this purpose the chamber comprises a temperature sensor (29) which is placed in the chamber, preferably in the outlet (19). This sensor is connected to a temperature regulator (30), either analog or digital, which compares the measured temperature against an adjustable reference value and which issues a command signal to the motorised valve (20), actioning this valve in the direction tending to nullify the difference between the measured temperature and the reference value.

Tests have been performed by introducing 150 Kg/h of a high density (958 Kgm$^{-3}$) polyethylene powder into an apparatus such as that shown in FIG. 2, having a length of 105 cm and a diameter of 60 cm. The mean residence time of the powder was 2 minutes and 30 seconds. The powder was introduced into the apparatus at 80° C. and was raised to 118° C. No agglomerate of particles was observed. The content of non-polymerised hydrocarbons in the powder which was 0.12 cm$^3$ of ethylene per gram of polymer was divided by 100. The powder leaving the apparatus was introduced into an extruder without any special steps having to be taken.

In the normal degassing process, polyethylene leaves the secondary degasser at a temperature of 40° to 50° C., and the energy necessary to melt it in a pelleting device is of the order of 190 Wh/Kg. The energy to be fed to the pelletizer machine receiving polyethylene leaving a degassing device according to the invention at a temperature of the order of 118° C. is no more than 130 Wh/Kg, which is a very considerable saving with a better degassing result.

The experiment has been repeated with a copolymer of ethylene and of but-1-ene of 0.918 density, instead of high density polyethylene. The temperature in the apparatus such as that shown in FIG. 2 was varied between 95° C. and 105° C. The powder leaving the apparatus was introduced into an extruder without any problems occurring.

I claim:

1. In apparatus in which alpha-olefins are polymerized in the gas phase in a reactor containing a catalyst, said reactor having a reactor outlet through which solid polyolefin particles and gases pass, a primary degasser connected to said reactor outlet for receiving solid polyolefin particles and said gases passing through said reactor outlet and for separating said solid polyolefin particles from said gases, said primary degasser having an outlet through which solid polyolefin particles with accompanying gases pass, and a secondary degasser connected to said outlet of said primary degasser for receiving the solid polyolefin particles and gases passing through said outlet of said primary degasser and for separating the last-mentioned solid polyolefin particles from the last-mentioned gasses, said secondary degasser having an outlet, and an extruder connected to said outlet of said secondary degasser for receiving solid polyolefin particles from the outlet of said secondary degasser and for pelleting the last-mentioned solid polyolefin particles, wherein the improvement comprises:

a secondary degasser with a housing having an inlet connected to said outlet of said primary degasser without intervening apparatus for preventing said particles of solid polyolefin passing through said outlet of said primary degasser from entering said secondary degasser as particles and said secondary degasser having a mechanical stirrer within said housing and means connected to said mechanical stirrer and driving said mechanical stirrer at a rate which heats said particles of solid polyolefin to a temperature close to the minimum sintering temperature of said particles of solid polyolefin but less than the melting temperature of said particles.

2. Apparatus according to claim 1 wherein said inlet of said housing is connected to said outlet of said primary degasser without intervening apparatus for modifying the particle size of said particles of solid polyolefin passing through said outlet of said primary degasser.

3. Apparatus according to claim 1 wherein said inlet of said housing is connected to said outlet of said primary degasser by an unobstructed duct in series with a valve which, when said valve is open, permits the free flow of said particles of solid polyolefin from said outlet of said primary degasser into said secondary degasser.

4. Apparatus according to claim 1 wherein said housing defines a cylindrical chamber with a horizontal axis and wherein said mechanical stirrer comprises a rotatable shaft having its axis of rotation coaxial with the axis of said chamber, said shaft having arms extending radially therefrom and said arms having stirring blades thereon.

5. Apparatus according to claim 4 further comprising a valve connected to said outlet of said secondary degasser for controlling the flow degassed said particles of solid polyolefin out of said secondary degasser, a temperature sensor disposed to measure the temperature within said chamber and means responsive to said sensor and connected to said valve for controlling said valve in accordance with the temperature in said chamber.

6. Apparatus according to any one of claims 1, 4 or 5 wherein said housing comprises at least one further outlet for removing gas from said secondary degasser.

* * * * *

UNITED STATES PATENT AND TRADEMARK OFFICE
CERTIFICATE OF CORRECTION

PATENT NO. : 4,921,678

DATED : May 1, 1990

INVENTOR(S) : CHARLES RAUFAST

It is certified that error appears in the above-identified patent and that said Letters Patent is hereby corrected as shown below:

Column 4, line 67, "produced by the actor" should read --produced by the reactor--.

Column 8, line 43 (claim 5, line 3), after "flow" and before "degassed" insert --of--.

Signed and Sealed this

Twentieth Day of August, 1991

Attest:

HARRY F. MANBECK, JR.

*Attesting Officer*  *Commissioner of Patents and Trademarks*